Aug. 18, 1942.   G. M. RICKUS   2,293,663
PROCESS AND APPARATUS FOR HAT MAKING
Filed Feb. 21, 1939   7 Sheets-Sheet 1

Fig. 1

INVENTOR
GEORGE M. RICKUS
BY William T. Feyrer
ATTORNEY

Aug. 18, 1942. G. M. RICKUS 2,293,663
PROCESS AND APPARATUS FOR HAT MAKING
Filed Feb. 21, 1939 7 Sheets-Sheet 2

INVENTOR
GEORGE M. RICKUS
BY William J. Veyrer
ATTORNEY

Aug. 18, 1942.                G. M. RICKUS                2,293,663
                    PROCESS AND APPARATUS FOR HAT MAKING
                    Filed Feb. 21, 1939           7 Sheets-Sheet 6

INVENTOR
GEORGE M. RICKUS
BY William T. Teyrer
ATTORNEY

Aug. 18, 1942.    G. M. RICKUS    2,293,663
PROCESS AND APPARATUS FOR HAT MAKING
Filed Feb. 21, 1939    7 Sheets-Sheet 7

INVENTOR
GEORGE M. RICKUS
BY William T. Veyrer
ATTORNEY

Patented Aug. 18, 1942

2,293,663

UNITED STATES PATENT OFFICE 2,293,663

PROCESS AND APPARATUS FOR HAT MAKING

George M. Rickus, Norwalk, Conn., assignor to Hat Corporation of America, Norwalk, Conn., a corporation of Delaware Application February 21, 1939, Serial No. 257,640

14 Claims. (Cl. 28—8)

This invention relates to an improved method and apparatus for working or making hats. More particularly, it relates to an improved method and apparatus for hardening or starting hats, for convenience herein called the "R- method."

Broadly, the manufacture of hats from fur felt and the like is conducted in what is often termed a back shop and a front shop. The back shop is usually confined to operations taking the loose fur or like material and processing the same to the rough or first forming operation, and is usually confined to wet working. The front shop is usually confined to finishing operations, taking the hats through their various forming or shaping operations and their surfacing and trimming operations.

The present invention relates to back shop improvements.

One of the critical and important phases in the manufacture of hats is the hardening or starting step between the coning and the main shrinking operation, the latter being usually done on the so-called and well-known Genest machines, as shown in one or more of the Homer A. Genest Patents Nos. 1,533,349, 1,533,350, 1,533,351, 1,821,432 and 2,112,207; and in the William Lorenz Patent No. 1,535,324. In these latter machines the hat bats are each individually (or in pairs) subjected to a vigorous and hard working. As the bat or cone comes from the coning operation it is so "tender" or "green," in the parlance of the hatter, that the utmost care must be exercised in handling, for even a slight rub with one's finger may bruise and spoil the same.

Heretofore, the starting operation which aims fundamentally at shrinking the hat slightly and at toughening the hat bat so that it may withstand the hard and individual shrinking as on Genest machines, or final back shop working, consisted of a careful manual manipulation of the hat bats while in a saturated condition by skillful craftsmen. More recent "starting" proposals included a special machine which still required very skillful workers.

Both of these previous procedures had many drawbacks, among which may be mentioned: slow and costly production; nonuniform product; use of only highly skilled workers; lack of proper preparation for the later sizing operations.

It is therefore an object of the present invention to displace the present slow, nonuniform hand starting, and to provide highly satisfactory apparatus for starting hat bats.

Another object of the present invention is to provide apparatus for starting hat bats which may be operated by a comparatively unskilled worker.

A further and important object of the present invention is to provide apparatus for starting hats inexpensively.

Yet another and very important object of the present invention is to provide a simple process and apparatus for starting hats uniformly to facilitate satisfactory processing in the subsequent sizing operations.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring now in detail to the drawings which illustrate the present preferred embodiments of the invention, it will be noted that the improved apparatus for practicing applicant's improved method includes a first starting apparatus, shown in Figs. 1 through 8, and a second starting apparatus, shown in Figs. 9 through 17.

The first starting apparatus will now be described. It comprises a large main frame 10 with suitable top crossbars 11 having large main bearings 12 and 13 rotatably supporting shafts 14 and 15 respectively.

Each of the shafts 14 and 15, according to the present invention, have cylindrical frames 16 and 17 respectively suitably secured thereto for rotation. The frames are provided with spaced-apart pressing rods 18 and 19 at or near the periphery of heads 20 and 21 extending longitudinally of the frame, for supporting a roll 22 of hat bats 23 which are to be started, as may be seen best in Fig. 2. The roll is formed by an operator superimposing a plurality of approximately four to twelve bats one upon the other and then rolling the superimposed bats up in a piece of flannel or burlap.

In order to maintain the roll of bats 23 in the depression 24 between the frames 16 and 17, and to press the roll 22 of bats 23 upon the frames 16 and 17, the present invention provides a pressure mechanism 25 including a swing frame 26 pivotally mounted upon a shaft 27 and upright standards 28 near the back of the machine. At the front of the swing frame there is provided a front pressure roller 29 rotatably mounted upon a shaft 30 in bearings 31 and 32. Slightly at the rear of the roller 29 is a semifloating rear roller 33 on a shaft 34 extending through vertical elongated slots 35 on both sides of swing frame 26. The front roller 29 prevents the roll of bats from following the frame 16 in its rotation to a point over the top of the cylindrical frame and off the front of the machine. The rear roller 33 complements the front roller in this purpose also. Both of the rollers 29 and 33 serve to press the roll of bats upon the rods 18 and 19 in the cylindrical frames 16 and 18 with a predetermined degree of weight or pressure.

Now, of particular importance, the present invention provides a yielding or spring mechanism 36 to complement the gravity or weighted rollers 29 and 33 and swing frame 26 in pressing the roll of bats upon the cylindrical frames 16 and 17. This spring mechanism includes a coil spring 37 hooked into a hole 38 in the swing frame 26 as may be seen best in Fig. 2 while the other end of the spring is secured to a chain 39 and the latter in turn to a finger 40 on a bar 41 which extends lengthwise of the machine. This spring mechanism 36 has the advantage of imposing a greater pressure to the roll of bats when a larger number of bats, or bats of heavier material and therefore greater bulk, are placed in the machine; viz., when a larger roll of bats is placed in the machine it is desirable to have greater pressure in order to effect a working of the bats near the center of the roll.

Figure 1:
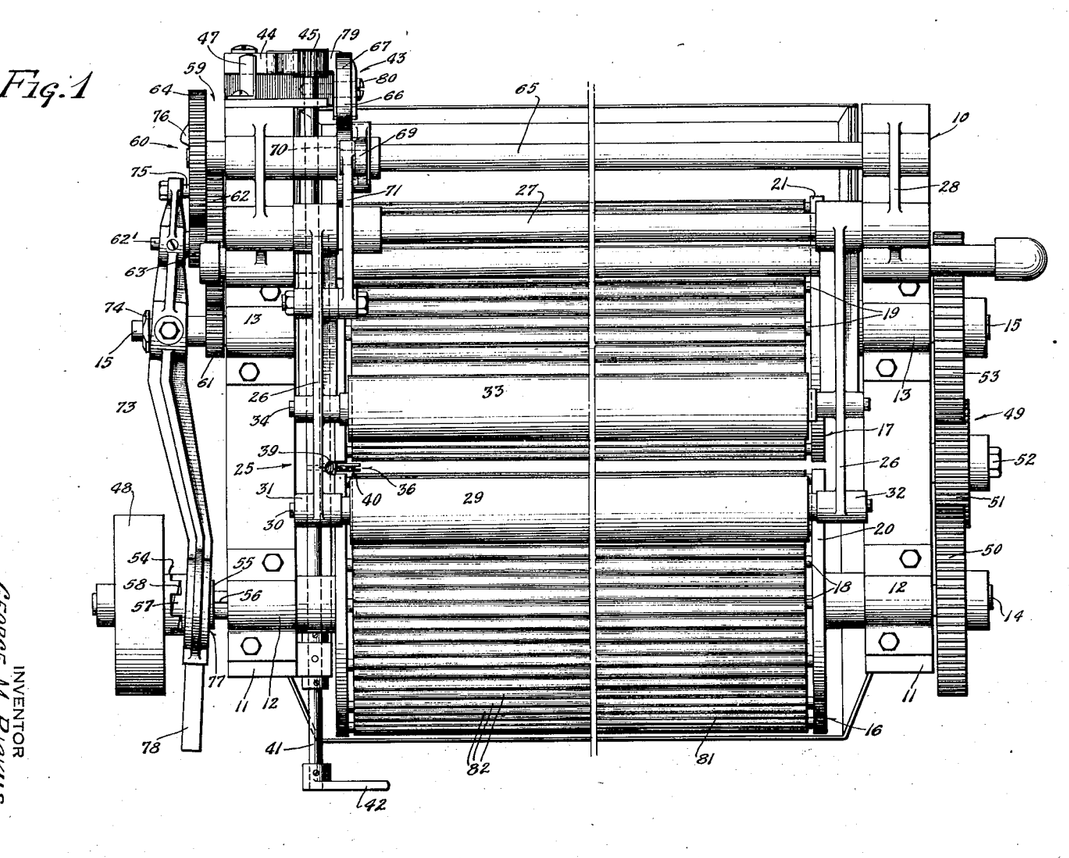
Figure 1 is a top view of the machine.
Figure 2:
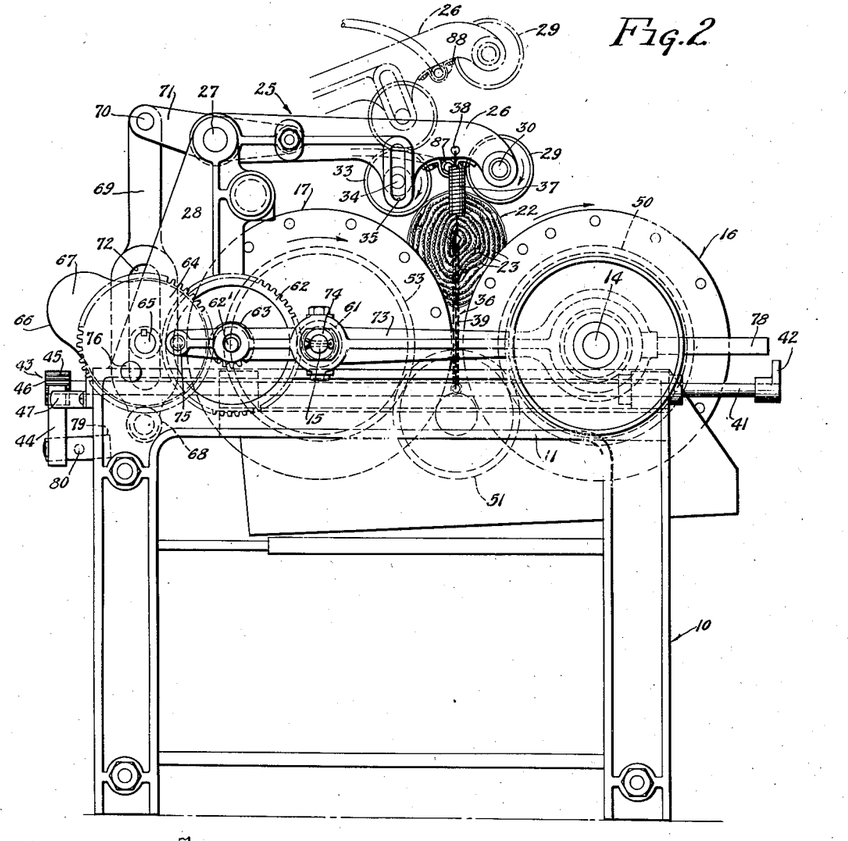
Fig. 2 is a side view of the machine.
Figure 3:
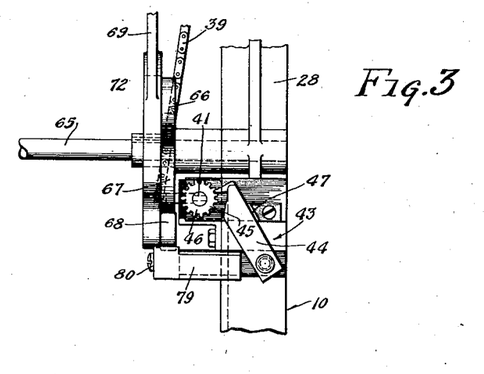
Fig. 3 is a fragmentary detail of the releasing mechanism.
Figure 4:
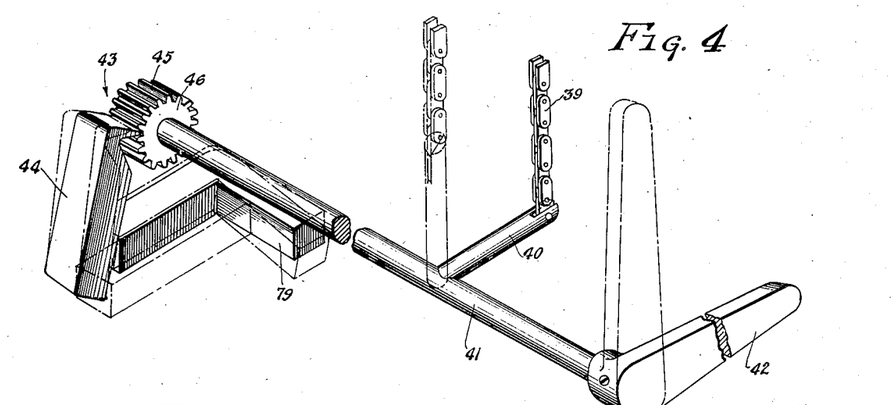
Fig. 4 is a fragmentary detail of the clutch and pressure control mechanism.

The operator may move the yielding pressure mechanism 36 into play by merely rotating a hand lever 42 on the rod 41 in a clockwise direction, as viewed in Figs. 1 and 4, whereupon the finger 40 pulls the chain 39 and coil spring 37 into the lowered position shown by full lines in Figs. 2 and 4 to complement the gravity or weight of the pressure mechanism 25 with the force stored in the yielding coil spring. The yielding mechanism 36 is maintained in the lowered or depressed condition by a ratchet mechanism 43 including a ratchet dog 44 which merely drops between the teeth 45 of a ratchet wheel 46 affixed to the rear end of the shaft 41.

If the lever is turned only a slight amount light pressure is applied and if moved a considerable extent heavy spring pressure is applied. Also, if it is moved to the same point each time larger rolls of bats tend to automatically increase the yielding pressure. Thus, it is possible to impose a light or a heavy yielding pressure to the swing frame 26 and roll 29 in addition to the gravity weight thereof. Preferably, this ratchet finger is backed by a flat spring 47, as may be seen best in Figs. 1, 2 and 3. Release may be effected by turning the lever 42 in a counterclockwise direction, or automatically as explained in detail herewith.

The spring mechanism just described in detail may, when turned to the same position each time, be used to automatically increase the pressure upon the bats as the size of the roll is increased. It serves the further advantageous function of maintaining the swing frame 26 and roll 29 upon the roll 22 of bats regardless of the size of the roll, with various degrees of pressure beyond the regular gravity weight thereof by the operator imposing the desired spring pull thereon by turning the lever 42 and ratchet mechanism 43 into the desired pulling station.

In driving or operating the machine it is desirable to have the cylindrical frames 16 and 17 rotated as shown by the arrows A and B. For example, observing in Figs. 2 and 5, the frames 16 and 17 are both given a clockwise rotation, thereby causing the roll of bats to be continuously rotated in a counterclockwise direction while it rests thereon. To this end the present invention provides a pulley 48 on the shaft 14 which may be connected to any suitable source of power while a train of gears 49 at the opposite end of the shaft 14 including a gear 50 secured to shaft 14 meshing with an intermediate gear 51 freely rotatable upon a stud 52 on the side of the frame 10 which in turn meshes and drives a gear 53 secured to the shaft 15 of the other cylindrical frame 17. The gears 50, 51 and 53 insure a coordinate clockwise rotation of the cylindrical frames 16 and 17 whenever the pulley 48 is operated and a clutch 54 is engaged therewith.

The clutch 54 includes a collar 55 having a usual key-and-slot connection 56 with the shaft 14 to permit longitudinal movement thereon but which prevents relative rotation, and having teeth 57 engageable with teeth 58 on the pulley 48 which is normally freely rotatable upon the shaft 14. This clutch may be of any usual type and therefore further description seems unnecessary.

In order to insure a uniform treatment for working hat bats 23 in the present apparatus the present invention provides an automatic control mechanism 59 adapted to automatically remove the pressure mechanism from the roll of bats and to discontinue rotation of the cylindrical frames 16 and 17 after a predetermined length of time or operation. In its present preferred form this control mechanism includes a train of gears 60 having a small gear 61 secured to the shaft 15 meshing with and rotating a large gear 62 on a suitable stud 62' which has secured thereto a small gear 63 meshing with and rotating a large gear 64 on a cam shaft 65 extending across the back of the machine. This train of gears 60 causes the cam shaft 65 to rotate in unison with the shafts 14 and 15 of the frames 16 and 17 respectively.

A cam 66 is suitably secured upon the shaft 65 to rotate therewith and includes a lobe 67 adapted to engage with a roller 68 upon the lower end of a link 69 pivotally connected as by a stud 70 to an arm 71 at the back of the swing frame 26. A slotted aperture 72 on the link 69 envelops the shaft 65 to insure substantially vertical movement of the link 69 when the cam 66 engages with the roller 68. As the lobe 67 engages with the roller 68 it moves the link 69 downwardly, as viewed in Fig. 2, whereupon the stud 70 on the arm 71 pulls the swing frame 26 into the raised position shown by dot-and-dash lines in Fig. 2.

Disengagement of the clutch 54 is effected by a control arm 73 pivotally mounted upon a sleeve 74 with studs 62' and 15, as may be seen best in Figs. 1 and 2, when a contact member 75 at the rear end thereof engages a lobe 76 on the side of the gear 64. At its forward end the arm 73 is provided with a suitable connection 77 to the toothed collar 55 of the clutch 54 on the shaft 14.

Operation of the driving mechanism is as follows: The operator merely grips a handle 78 on the control lever 73 and moves it to the left, as viewed in Fig. 1, whereupon the pulley 48 through the clutch 54 rotates the shaft 14 and concurrently the gear trains 49 and 60 effect a rotation of the shafts 15 and 65. Thereupon the pressure mechanism drops upon the roll 22 of bats as the lobe 67 moves clear of the roller 68, and the frames 16 and 17 are rotated a predetermined number of times, according to the gear reduction in the train 59, until the lobe 67 makes one complete rotation from its lowermost position engaging the roller 68 until it again engages with the roller 68 to lift the swing frame 26. At the same time the lobe 76 engages the contact member 75 to turn the control lever 73 in a counterclockwise direction about the pivots 62' and 15, as viewed in Fig. 1, to pull the clutch collar 55 from the freely rotatable pulley 48.

At substantially the same time that the control lever 73 is moved to the operating position, the operator turns the hand lever 42 in a clockwise direction any desired extent as viewed in Figs. 1 and 4 to move the yielding pressure mechanism into operative position where it is maintained by the ratchet mechanism 43. This ratchet mechanism maintains the yielding pressure mechanism in the operative condition until the lobe 67 on the cam 66 engages a finger 79 whereupon a right-angle extension of the finger 79 engages with the ratchet dog 44 to throw it clear of the ratchet wheel 46. This release finger is pivotally mounted upon a suitable stud 80 at the back of the machine.

Figure 5:
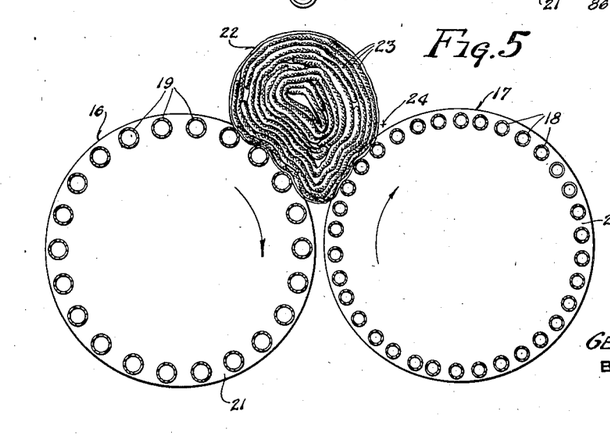
Fig. 5 is a sectional view of one form of cylindrical frames, provided by the present invention.

Fig. 5 shows the simplest form of the present invention wherein the pressing rods 18 and 19 are substantially rigid and are not covered in any manner. However, and of particular importance in accordance with the present invention, the rods 18 and 19 of the frames 16 and 17 are spaced apart relatively different extents. More particularly, the pressing rods 19 of the cylindrical frame 17 are widely spaced apart whereas the rods 18 of the cylindrical frame 16 are narrowly spaced apart. Thus, it will be seen that the cylindrical frames 16 and 17 each imposes a different type of working action upon the roll of bats supported thereon. The rods 19 on the frame 17 which are spaced wide apart give fuller pressing, punching, kneading or like actions to the roll of bats than the rods 18 on the frame 16. Also, because they are widely spaced they allow considerable displacement of the materials between the rods and it therefore follows that they have the capacity to press toward the center of the roll of bats a considerable extent.

However, the rods 18 of the frame 16 are spaced quite close together, compared to the rods 19 on the frame 17, and therefore give a different and possibly gentler action to the bats treated in the machine. Roughly, it may be stated that the frame 17 kneads the bats approximately twice as much as the rods 18 on the frame 16. Of particular importance, it should be noted that the frames 16 and 17 each imparts a different extent or type of working to the hat bats and thereby achieves a better working of the furs within the individual hat bats and results in a more satisfactory final product.

Figure 6:
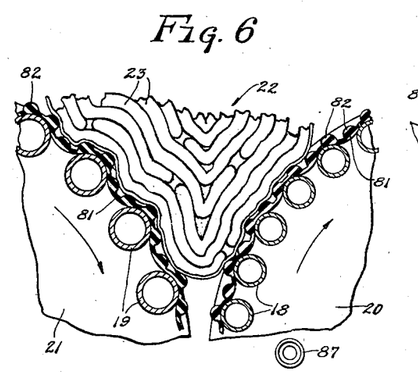
Fig. 6 is a fragmentary sectional view of the cages blanketed.
Figure 8:
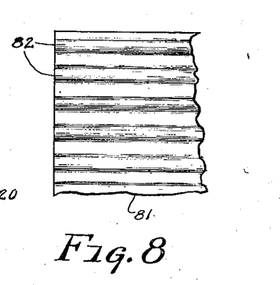
Fig. 8 is a fragmentary front view of the blanket and cylinder.

This kneading action may be further facilitated, according to the present invention, through the provision of a rubber mat 81 on each of the frames 16 and 17 preferably having longitudinally extending ribs 82 throughout their length. These mats are preferably made of rubber so that the materials or ribs 82 thereon yield gently under load while the machine is operating. This mat structure is best seen in the fragmentary views 6 and 8. The ribs 82 on the mats 81 are spaced relatively close together. Thus, it will be seen that in the one machine it is possible to impose a series of main hard pressing or kneading action to the roll of bats and concurrently impose a large number of yielding presses with the cylindrical frames 16 and 17.

Also, it will be seen that the frames 16 and 17 somewhat similarly impose a series of comparatively hard presses to the roll of bats concurrently, while the mats thereon simultaneously impart a series of yielding presses to the bats. The series of widely and narrowly spaced apart hard presses to the roll of bats and the concurrent series of yielding presses to the roll of bats achieves a very quick and efficient working of each of the bats.

In the preferred embodiment of this invention the mats 81 on the frames 16 and 17 are provided with ribs 82 which extend longitudinally of the frames in much the same direction as the rods 18 and 19 thereon. Fig. 8 is a fragmentary view showing the front of the present preferred form of mat. It has been found in practice that such a form of mat imposes a very desirable and efficient working to the bats.

Figure 7:
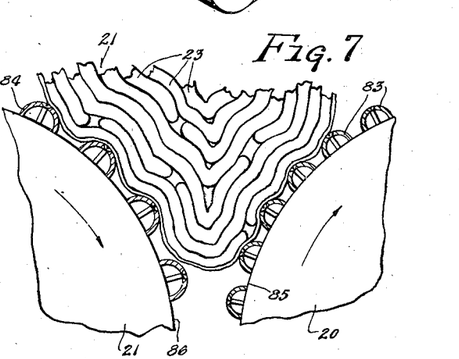
Fig. 7 is a fragmentary sectional view of cylindrical frames with modified rods.

That form of the invention disclosed in Fig. 7 is similar to that shown in Figs. 5 and 6, differing therefrom primarily in the provision of longitudinally extending rods 83 and 84 which are screwed at the peripheral edges 85 and 86 of heads 20 and 21 on the cylindrical frames 16 and 17, respectively. These frames may be used plain as the frame shown in Fig. 5 or may be provided with rubber mats, such as the mat 81, on one or both of the frames. The mats serve the further purpose of facilitating soaking water into the roll 22.

Although the bats may be soaked in hot water before they are placed in the roll and set in the machine, the excess water is quickly squeezed therefrom when the machine begins to operate. Normally water is applied to the bats only after they have been placed in the machine. According to the present invention, there is provided a constant stream of hot water from a pipe 87 extending longitudinally of the frames 16 and 17 and preferably secured to the swing frame 26 as by a bracket 88 to be raised and lowered relative to the roll of bats and to the frames 16 and 17 with the swing frame 26. It has been found by considerable experimentation that the temperature of approximately 205 degrees of hot water is ideal. However, it will be appreciated that the temperature thereof may be raised or lowered from approximately 180 degrees to 212 degrees and still obtain satisfactory results.

Applicant's process through the first starting stage consists primarily in the steps of (1) placing a plurality of hat bats in a roll, (2) subjecting the roll of hat bats concurrently to a plurality of kneading or pressing forces, preferably of the major and minor type herein disclosed. In its more efficient arrangement applicant's process includes steps (1) and (2) and the concurrent step of subjecting the roll of bats to a stream of water between 170 degrees and 212 degrees in temperature. In its most highly developed arrangement applicant's process includes the steps of (1) placing a plurality of hat bats in a roll, (2) concurrently subjecting the roll of bats to kneading or pressing forces, preferably in the form of major and minor substantially rigid forces and at the same time subjecting the same to a series of small yielding forces, (3) concurrently applying hot water, preferably between the temperatures of 170 degrees and 212 degrees, to the roll of bats. Preferably, in this first stage of the "R-method," the hat bats are given a comparatively slow rolling with light pressure, compared to the high speed and heavy pressure in the second stage now about to be described.

In the second stage of starting hats, according to the present invention, another and particularly important apparatus as well as somewhat different steps are used. These will now be described, and to this end attention is directed particularly to Figs. 9 through 18, inclusive.

The "second stage" apparatus or machine 89 is highly efficient, practically automatic in its operation, and makes a very uniform product. It includes a main frame 90 with sides 91 and 92. Bearings 93 and 93' in the sides 91 and 92 support a main roller 94, preferably with a rope 95 or the like spirally secured thereto. Similarly, bearings 96 and 96' rotatably support a second main roller 97 having wood strips 98 or the like secured thereto. Preferably, the main rollers 94 and 97 are both power driven, as by a driving mechanism 99 soon to be described.

The two main rollers 94 and 97 are spaced from each other sufficiently to in effect form a pocket adapted to receive a bundle or roll 100 of hat bats 101 suitably laid together and enclosed preferably in a piece of burlap 102 or the like.

Disposed above the two main rollers 94 and 97 is a pressing mechanism 103 including a retractable pressure roller 104 which may be provided with wood strips 105 or the like to provide a rough surface or pressing protuberances thereon. The pressing mechanism preferably includes a swing frame 106 with side plates 107 pivotally mounted on the rod 108 for the roller 97. A shaft 109 for the pressure roller 104 extends into suitable bearings 110 and 110' in the swing frame 106.

Figure 11:
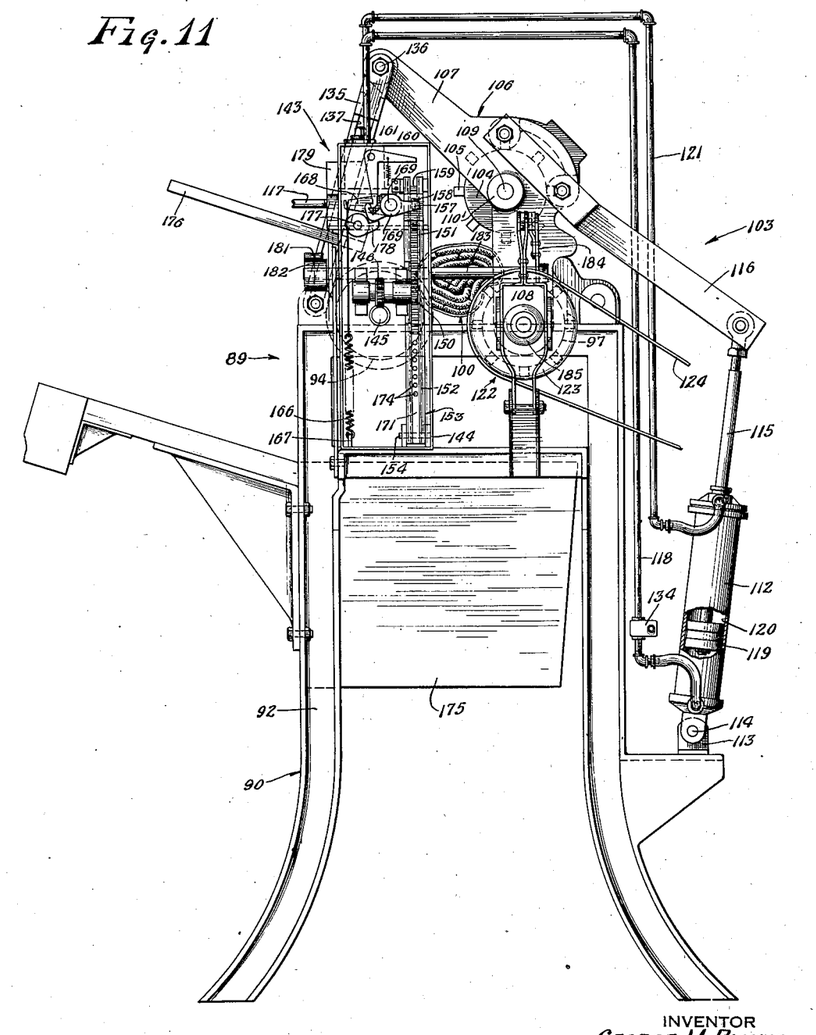
Fig. 11 is a side view of the machine shown in Fig. 10.
Figure 12:
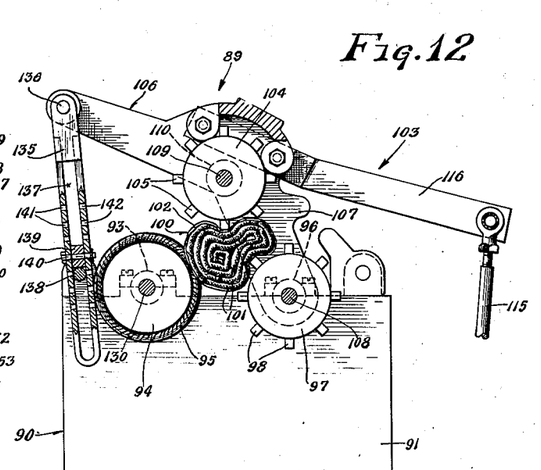
Fig. 12 is a fragmentary view showing the rollers in the operative position.
Figure 13:
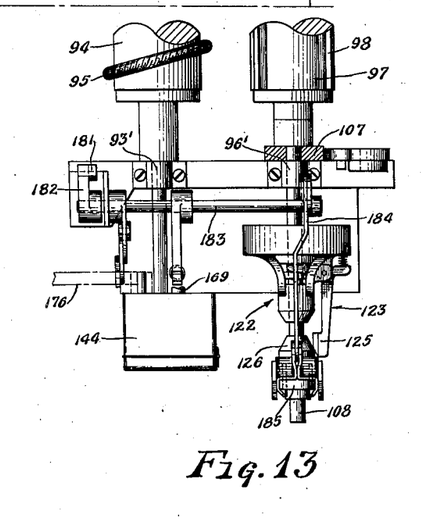
Fig. 13 is a fragmentary view showing the clutch section of the machine, in the operative position.

Now, of particular importance, the present invention provides a novel automatic mechanism for controlling the pressing mechanism 103; or, more specifically projecting the swing frame 106 and the pressure roller 104 thereon away from the retracted position shown in Fig. 11 into the operative position upon the bundle 100 of bats 101 as shown in Fig. 12, and also to effect a retraction thereof from the operative position shown in Fig. 12 to the inoperative position shown in Fig. 11. For this purpose a two-way, double-acting fluid cylinder 112 is provided on a bracket 113 at the back of the machine. Preferably, the fluid cylinder 112 is pivotally mounted upon a stud 114 and has a piston rod 115 connected to an arm 116 extending rearwardly from the swinging frame 106. When a flow of fluid is directed from the feed inlet 117 into the bottom of the cylinder 112 through the line 118 it projects a piston 119 upwardly in a bore 120 of the cylinder 112 to arcuately move the swing frame 106 about the rod 108 into the operative position. Similarly, when fluid is passed through the line 121 to the top of the cylinder it projects the piston 119 downwardly in the bore of the cylinder and causes the interconnected rod and arm 115 and 116 to arcuately move the swing frame in a clockwise direction, as viewed in Fig. 11, into the retracted or inoperative position.

The driving mechanism 122 includes a clutch 123 on the rod 108 suitably connected to any prime mover as by a belt 124 (see Fig. 11). The clutch may be of any conventional type. When the clutch is closed, as by spreading finger 125 with cone 126, the belt 124 serves to rotate the shaft 108 and the roller 97 thereon. Concurrently, a chain 127 extending from a sprocket wheel 128 on the shaft 108 to a sprocket wheel 129 on the shaft 130 of the other main roller 94 serves to concurrently rotate the latter (see Fig. 9 and 10). Although not absolutely essential, the pressure roller 104 is also preferably rotated concurrently with the main rollers 94 and 97. For this latter purpose a second sprocket wheel 131 is secured to the shaft 109 and through a chain 132 extending to a sprocket wheel 133 secured to the shaft 109 of the pressure roller serves to rotate the latter concurrently with the main roller 97 and/or 94.

Concurrent rotation of the main rollers 94 and 97 and the pressure roller 104 is thus effected by merely closing the clutch 123, and discontinuance of the rotation thereof is effected by merely opening the clutch 123.

The fluid cylinder 12 may be used to maintain the pressure roller 104 in engagement with the roll 100 of bats 101 as shown in Fig. 12 with a predetermined degree of pressure as by a conventional blowoff valve 134 shown in Fig. 11 which releases or opens automatically when a predetermined amount of fluid pressure has been injected into the lower end of the cylinder 112.

Figures 9, 10:
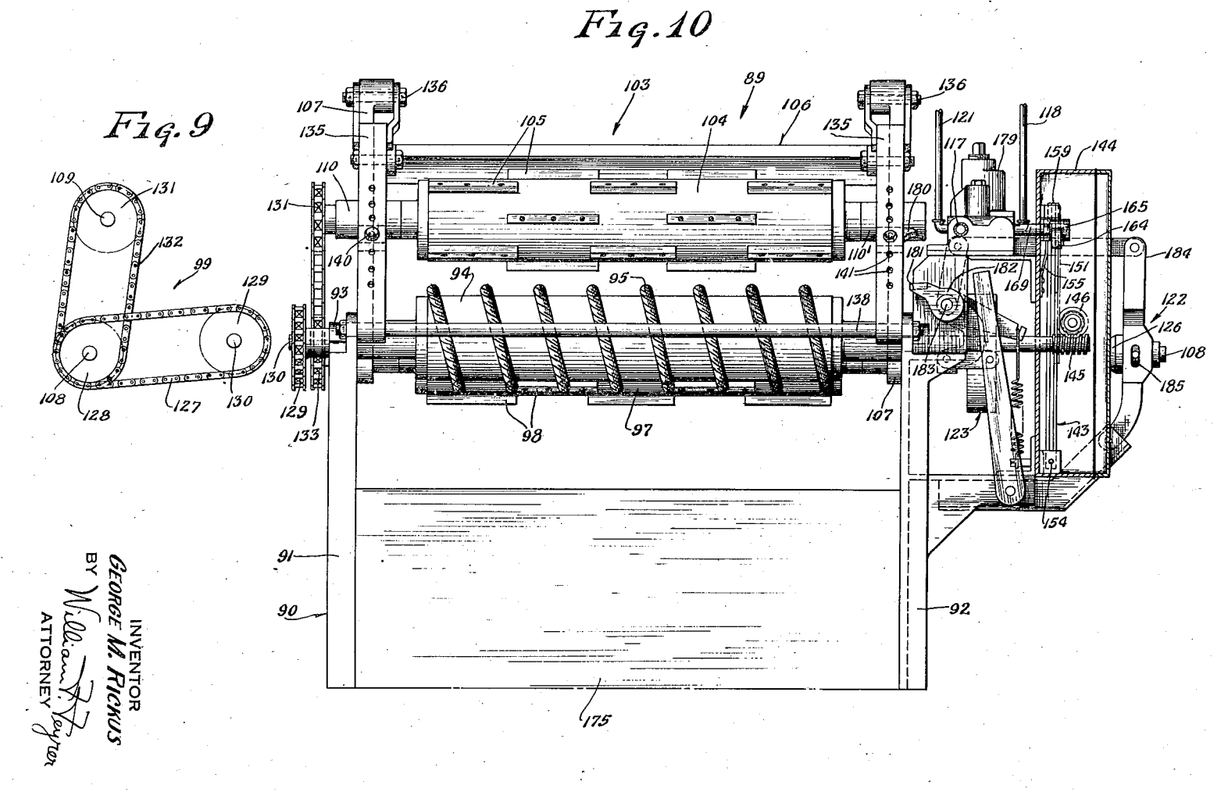
Fig. 9 is a fragmentary detail of the driving mechanism.
Fig. 10 is a front plan view of the second starting apparatus.

Also, a predetermined amount of pressure may be accomplished by the mechanism, disclosed in Figs. 10, 11 and 12 particularly, through the provision of stop arms 135 pivotally mounted on studs 136 on the outer or forward ends of the side plates 107 of the swing frame 106. These stop arms 135 are preferably provided with elongated slots 137 accommodating a crossrod 138 and have closed ends thereon adapted to limit the retractive movement of this swinging frame. Adjustable blocks 139 slidable in the elongated slot 137 and held in various locations by studs 140 passed through selected transverse holes 141 and 142 limit the downward movement of the swing frame into the operative position. Since the hat bats 101 are initially made with a carefully weighed amount of fur and the rolls 100 of bats 101 are of substantially uniform diameter so that the force of the pressure roller thereon is substantially uniform whenever the swing frame is moved into the stopped operative position the blocks 139 thus serve to regulate the amount of force applied by the pressure roller 104 upon the roll 100 of bats 101.

Timing mechanism 143 is provided by the present invention to accurately control the working which the roll 100 of bats 101 is subjected to. Thus, it is possible to subject the bats 101 to a light working by rotating the rollers just a few times; or, to a heavy or considerable working by rotating the rollers 94, 97 and 104 a considerable number of times. This is important in making hats, to obtain hats of a certain texture uniformly from the starting operation. For example, thin lightweight hats may be subjected to just a light working whereas heavy body hats may be subjected to a considerable or heavy working, and by accurately and automatically controlling the number of rotations imparted to the rollers a uniform product results from the present starting method and apparatus. Also, by controlling the pressure and rotation accurately it is possible to impart a far greater pressure and a faster rotation than was heretofore thought possible, resulting in greatly increased production.

Figure 16:
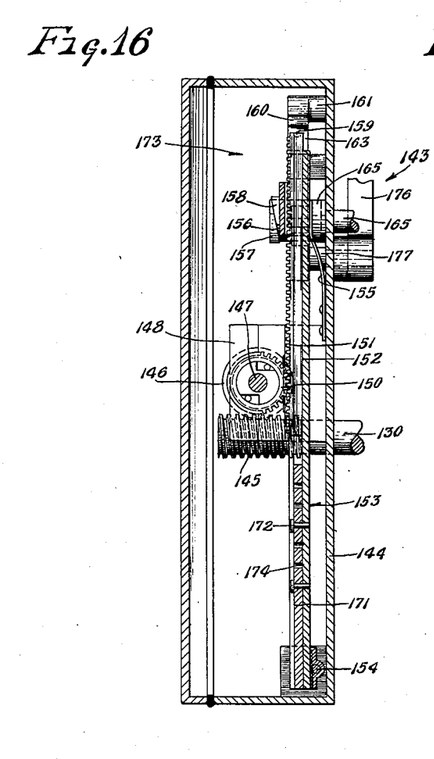
Fig. 16 is a detail view of the timing mechanism in the operative relation to the driving mechanism.

The timing apparatus 143 comprises a control box 144 secured to the side of the frame 90 in any suitable way. The shaft 130 extends within the box and at its end is provided with a worm 145 meshing with a worm gear 146 transversely supported in the box 144 by a shaft 147 and suitable bearing blocks 148 and 149. At one end the shaft 147 is provided with a spur gear 150 adapted to mesh with a rack 151. The latter rack is mounted for reciprocation in a suitable channel 152 provided in a rack swing frame 153 which is pivoted upon a stud 154 near the bottom of the box 144. A flat spring 155 serves to normally urge the rack into engagement with the spur gear 150 whenever an inclined plane 156 at the back of the finger 157 is in the lowered position as shown in Fig. 16, whereby it allows the inclined lug 158 and the associated rack frame 153 to move in a counterclockwise direction about the stud 154.

Thus, while the roller 94 rotates the worm 145, worm gear 146 and spur gear 150 cause the rack 151 to gradually rise in the channel 152 until a top end 159 thereon engages a finger 160 on a trip-pawl 161 to release the trip-pawl as by moving a detent 162 on a finger 163 section thereof out of engagement with a detent finger 164 on the lever 165.

Figure 14:
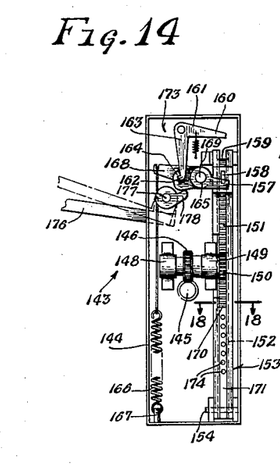
Fig. 14 is a view of the roller control box with the top plate removed.
Figure 17:
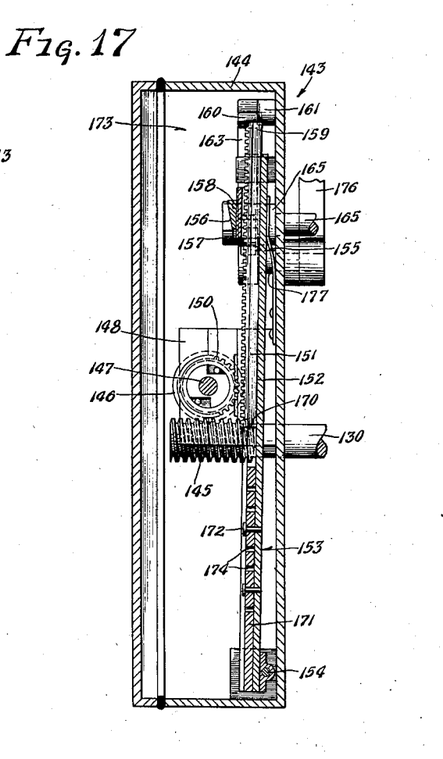
Fig. 17 is a detail view, similar to Fig. 16, but showing the parts disconnected from the driving mechanism.
Figure 18:
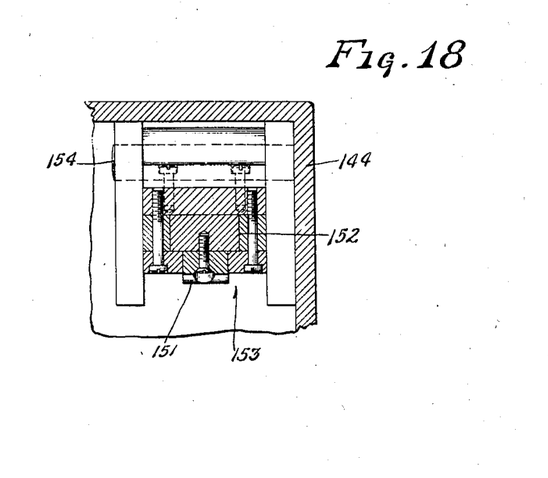
Fig. 18 is a fragmentary view of the control box and timing mechanism taken on line 18—18 in Fig. 14.

As the pawl 161 is released a spring 166 connected to the box 144 at 167 and to a lever 168 secured to the rod 169 serves to arcuately move the rod, as viewed in Fig. 14 particularly, whereupon the inclined plane is moved upwardly as viewed in Fig. 17 and works against the lug 158 to swing or push the rack frame 153 in a clockwise direction about the stud 154 until the rack 151 is free of the spur gear 150 whereupon it drops in the channel 152 until a lower end 170 thereon engages with the stop member 171 which is set in a predetermined position in the channel 152 by studs 172.

By setting the stop member 171 in a lower position in the channel 152 the rack 151 is allowed to drop a considerable extent and consequently must be driven upwardly by the spur gear 150 a considerable extent before the top end thereof engages and operates the pawl mechanism 173 whereby the rollers are automatically rotated a considerable extent before release thereof is effected.

To automatically effect a few rotations of the rollers 94, 97 and 104 it is merely necessary to set the stop member 171 in a higher position in the channel 152 whereby the rack drops only a short extent before the lower end 170 engages the stop member and whereby the top end is lifted only a short extent by the spur gear before operating the pawl mechanism 173. Various settings of the stop member may be effected by merely moving other holes 174 in the stop member into location and engagement by the setting pins 172.

Operation of the machine is as follows: A roll 100 of bats 101 is placed between the rollers 94 and 97 after dipping the roll of bats in hot water in tank 175, whereupon a lever 176 is pressed downwardly, or in a counterclockwise direction as viewed in Figs. 11 and 14, to move the pawl mechanism 173 from the released position shown in Fig. 11 to the operated position shown in Fig. 14 by arcuately moving a rod 177 and a finger 178 secured thereto in a counterclockwise direction whereupon the finger 178 kicks a detent finger 164 on a lever 165 in a clockwise direction upwardly from the position shown in Fig. 11 to the position shown in Fig. 14. Concurrently, the lever 165 in this arcuate movement rotates a rod 169 to operate a fluid valve 179 so that the latter directs fluid through the pipeline 118 to the lower end of the cylinder 112 thereby causing the piston 120 and rod 115 to move the swing frame 106 counterclockwise from the inoperative position shown in Fig. 11 to the operative position shown in Fig. 12. As pointed out hereinbefore, the pressure may be regulated so that the pressure roller 104 engages the roll of bats only to a predetermined degree, as by the release valve 134; or, the swing frame may be stopped in predetermined relation to the rollers 94 and 97 by stop members 139 engaging the crossrod 138.

Figure 15:
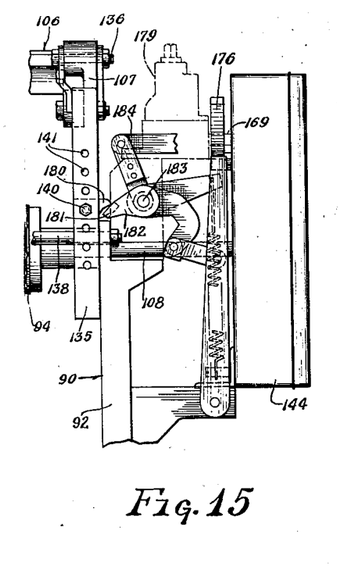
Fig. 15 is a front view of the roller control apparatus.

As the swing frame 106 is moved by the cylinder 112 toward the operative position shown in Fig. 12 an inclined lug 180 on the side of the adjustable stop block 139 engages a finger 181 on the lever 182 to move the rod 183 in a counterclockwise direction as viewed in Fig. 15 whereupon the linkage 184 closes the clutch 123 to rotate the rollers 94, 97 and 104. As the lever 165 is moved in a clockwise direction as viewed in Fig. 14 the inclined plane 156 thereon is moved from the position shown in Fig. 17 to the position shown in Fig. 16, whereupon the rack frame 153 is moved in a counterclockwise direction from the inoperative position with respect to the spur gear shown in Fig. 17 (with the rack shown in the channel) into the operative position with respect to the spur gear as shown in Fig. 16.

Thereafter the machine continues to operate with the swing frame 103 and rollers pressing and rotating the roll 100 of bats 101. Concurrently, the worm 145 through the worm gear 146 and spur gear 150 drives the rack 151 upwardly until the top end thereof contacts the finger 160 to release the pawl 161. As the pawl is released the spring 166 and lever 168 rotate the rod 169 in a counterclockwise direction as viewed in Fig. 14 to operate the air valve 179 so that the latter releases the fluid from the line 118 and from the lower side of the piston 112 and directs fluid from any suitable feeder inlet 117 through the other line 121 to the upper side of the cylinder 112 to drive the piston from an upper section of the cylinder toward the bottom thereof and also causes the rod 115 to move the swing frame 103 from the operative position shown in Fig. 12 to the inoperative position shown in Fig. 11. Concurrently as the lug 180 moves upwardly away from the finger 181 of the lever 182 the rod 183 rotates and through the linkage 184 pushes collar 185 outwardly on rod 108 to open the clutch 123 and thereby render the driving mechanism 122 inoperative.

Thus, it will be seen that the present invention provides a comparatively simple yet highly efficient apparatus for starting hats. Because the pressure and number of rotations may be very accurately controlled it is possible to operate these rollers at a very high rate of speed and thereby have a very high rate of production in each working day.

Applicant's process through the "second" starting stage consists in the steps of taking the hat bats as they come from the first stage apparatus or the like: (1) placing a plurality of hat bats in a roll; (2) soaking the roll of bats in hot water; and, (3) subjecting said roll of bats to a high speed rotation under uniform heavy pressure (the latter step is preferably done for two or three rounds).

Following is an outline of the old and new starting methods:

Old starting method

After the hats are given 1½ rounds (each round being usually 4 crozes, as well known to the hatter's art) of the hardening machine in the forming department with water at 160 degrees temperature and dripping very slowly, they are sent to the starting department, where skilled mechanics subject the hats to hot water and motion on the starting machine. This operation consists of dipping sets of hats into hot water of approximately 205 degrees Fahrenheit (170 to 220 degrees may be used) and then putting them in the starting machines, which develop approximately 37 revolutions per minute and leaving them in there about 15 seconds for each croze, or part of a round. This time is left entirely to each man's own judgment, which can cause hats to be marked if they are left too long in the machine and therefore cause them to be rejected as knock downs. Due to variance of time in motion the hats come out with decided lips or definitely out of shape and have to be pulled or strained in order to put them back into their natural cone shape which not only takes time and costs extra money but leaves the bodies in a weakened state. The hats are shrunk by this method to a given size, which takes approximately anywhere from 8 to 12 rounds, but, due to variables both in guessing the time and the handling by the different men, there always is a great difference of opinion as to the correct shrinking time, which gives quite a difference in earning power and always is a subject for argument by the men. Under this method, the average starter, in eight hours, can produce approximately 10 dozen hats, so, in getting out a large production of from 600 to 700 dozen, it is necessary to have from 60 to 70 skilled men, and no two men can produce hats alike.

New starting method

After the hats are given their 1½ rounds on the hardening machine in the forming room, they are then put on the "first stage" starting machine (Figs. 1 through 8), which takes the hat through the green stage. They are subjected preferably to two rounds with pressure and with water being sprayed on at approximately 200 degrees Fahrenheit temperature. Preferably, they are rotated slowly and with light pressure, compared to the speed of rotation and pressure in the "second stage," and with smoother rolls. In this first stage operation, there is no guess-work on the time as the hats are given so many revolutions in the machine, which then automatically kicks off. From here, they are put on the "second stage" machine (Figs. 9 through 17), which has an R. P. M. of approximately 150 or more, and also a device on this machine where the hats can be given a predetermined pressure. Preferably, they are soaked with hot water before being placed in the machine. On the machine, the hats are given from two to three rounds and the operator may be sure of obtaining a uniform shrunk size, each croze or part of a round taking only a few seconds (at present 7 to 9 seconds preferred) and being accurately controlled for pressure and extent or time of rolling. Thus, it is possible to eliminate all question of different earnings and eliminate nonuniformity of product. Under this method the hats are much more uniform and of better quality than the average production received from the old starting method. Because the pressure and the number of rolls or rotations given to the bats is exactly controlled, with this invention, the cone or bat sizes (e. g., 19x26) are uniformly produced. This was not possible with any previously proposed starting method and/or apparatus. This method can be set up either with semiskilled labor or with skilled labor. The production is approximately 22 dozen per day compared to 10 dozen per day with the old method. If set up with semiskilled labor, the savings over the old method would be approximately one-third. If set up with skilled labor giving the men the same earnings as they are now getting from the old method, there would still be a saving of approximately 12¢ or more per dozen with the new method.

Variations and modifications may be made within the scope of the present invention and portions of the improvements may be used without others.

Having thus described the invention what is claimed as new is:

1. In a machine for starting hat bats, the combination of a pair of rollers adapted to support a roll of bats; a pressure roller; a retractable support for said pressure roller, having operative and inoperative positions; and fluid operated means to move said support into the operative and inoperative positions.

2. In a machine for starting hat bats, the combination of a pair of rollers adapted to support a roll of bats; a pressure roller; a retractable swing frame for said pressure roller, having operative and inoperative positions; and fluid operated means to move said swing frame into the operative and inoperative positions.

3. In a machine for starting hat bats, the combination of means for rolling hat bats; pressing mechanism in said means; and fluid operated means for conditioning said pressing mechanism.

4. In a machine for starting hat bats, the combination of means for rolling hat bats; pressing mechanism in said means; fluid operated means for conditioning said pressing mechanism; driving mechanism; and timing mechanism for controlling said drving mechansm and said fluid operated means.

5. In a machine for starting hat bats, the combination of a pair of rollers adapted to support a roll of bats; a pressure roller; a retractable support for said pressure roller having operative and inoperative positions; fluid operated means to move said support; driving mechanism for said rollers; and timing mechanism for controlling said driving mechanism and said fluid operated means.

6. In a machine for starting hat bats, the combination of means for rolling hat bats; pressing mechanism in said means having operative and inoperative positions; actuating means for positively pushing said pressing mechanism into the operative position; driving mechanism; timing mechansm for controllng said actuating means, pressing mechanism and said driving mechanism; and fluid pressure means cooperating with the actuating means to force the pressing mechanism into operative position with a force substantially greater than gravitational force.

7. In a machine for starting hat bats, the combination of means for rolling hat bats; pressing mechanism in said means; driving mechanism; conditioning means adapted to concurrently render said pressing mechanism and said driving mechanism operative for a predetermined length of time; and means for changing the timing of said conditioning means.

8. In a machine for starting hat bats, the combination of a pair of rollers for supporting a roll of hat bats; a pressure roller; a support for said pressure roller; fluid operated means for maintaining said pressure roller upon a roll of bats carried by the pair of rollers with a constant predetermined pressure; and driving mechanism for at least one of said rollers.

9. In a machine for starting hat bats, the combination of means for rolling hat bats; pressing mechanism in said means; locking means for said pressing mechanism; driving mechanism; a sliding rack adapted to engage and release the locking means; and means associated with the driving mechanism and said rack for sliding the latter.

10. In a machine for starting hat bats, the combination of means for rolling hat bats; pressing mechanism in said means; locking means; a main driving mechanism; a sliding rack adapted to control the locking means; a spur gear actuated by said main driving mechanism; and means for shifting said rack into and out of operative association with said spur gear.

11. In a machine for starting hat bats, the combination of means for rolling hat bats; pressing mechanism in said means; a main driving mechanism; means for conditioning said pressing and driving mechanism; a spur gear in said driving mechanism; a rack for operating said conditioning means; a pivotally mounted frame for said rack; and means for swinging said frame, and the associated rack, into and out of operative engagement with the spur gear.

12. The method of starting hat bats which includes the steps of folding equal quantities of substantially like hat bats into separate rolls of bats; subjecting each of said rolls of bats to an equal amount of a first phase working including a slow rolling and light pressing action; subjecting each of said rolls of bats to hot water, of approximately 170 to 212 degrees Fahrenheit during the first phase working; subsequently soaking said first phase worked rolls of bats in water of approximately 170 to 212 degrees Fahrenheit; and a second phase working in which said soaked rolls of bats, from the first phase working, are subjected to predetermined extent of relatively faster rolling and relatively harder pressing action.

13. The process of starting hats which includes the steps of placing a plurality of hat bats into a roll; placing the roll in a preliminary starting machine; subjecting the entire roll alternately to a solid and to yielding squeezes throughout their entire length under pressure in excess of gravitational pressure; simultaneously with the squeezing action, subjecting the bats to a rolling action and to a continuous flow of water of approximately 200 degrees Fahrenheit, said flow striking the roll angularly distant from the yielding squeezing action; automatically terminating the squeezing and rolling after a predetermined time; crozing, re-rolling and re-squeezing the bats to complete two rounds; transferring the bats to a final starting machine; subjecting the bats to hot water; pressing the bats with extremely high pressure with unevenly surfaced rollers rotating at least approximately 150 revolutions per minute; automatically terminating said rolling and pressing after a predetermined time; and crozing, re-rolling and re-squeezing said bats in said final hat-starting machine to complete two rounds and to prepare the bats for rigorous individual back shop working.

14. The method of starting hat bats which includes the steps of folding equal quantities of substantially like hat bats into separate rolls of bats; subjecting each of said rolls of bats to an equal amount of a first phase working including a slow rolling and light pressing action; flowing hot water upon each of said rolls of bats during said first phase working; soaking said first phase worked rolls of bats; and subjecting each of said rolls of bats from said first phase working to an equal amount of second phase working including a quick rolling and heavy pressing action until each of said rolls of bats is reduced to a predetermined diameter.

GEORGE M. RICKUS.